(12) United States Patent
Conneely et al.

(10) Patent No.: US 7,668,535 B2
(45) Date of Patent: Feb. 23, 2010

(54) NOTIFICATION INFRASTRUCTURE FOR SENDING DEVICE-SPECIFIC WIRELESS NOTIFICATIONS

(75) Inventors: Shane Conneely, Hoboken, NJ (US);
Nathanial Freitas, New York, NY (US);
Will Meyer, Brooklyn, NY (US);
Jonathan Oakes, New York, NY (US);
Evan Simeone, New York, NY (US)

(73) Assignee: Palm, Inc., Sunnyvale, CA (US)

( * ) Notice: Subject to any disclaimer, the term of this patent is extended or adjusted under 35 U.S.C. 154(b) by 471 days.

(21) Appl. No.: 10/159,545

(22) Filed: May 31, 2002

(65) Prior Publication Data
US 2003/0050046 A1    Mar. 13, 2003

Related U.S. Application Data

(60) Provisional application No. 60/303,392, filed on Jul. 9, 2001.

(51) Int. Cl.
*H04M 1/663* (2006.01)
(52) U.S. Cl. .............. 455/412.2; 455/412.1; 455/414.1; 455/466
(58) Field of Classification Search .............. 455/412.2, 455/466, 412.1, 414.1
See application file for complete search history.

(56) References Cited

U.S. PATENT DOCUMENTS

| | | | |
|---|---|---|---|
| 5,530,693 A | 6/1996 | Averbuch et al. | |
| 5,758,088 A | 5/1998 | Bezaire et al. | |
| 5,784,562 A | 7/1998 | Diener | |
| 5,872,926 A | 2/1999 | Levac et al. | |
| 5,974,461 A | 10/1999 | Goldman et al. | |
| 5,999,942 A | 12/1999 | Talati | |
| 6,055,424 A | 4/2000 | Tornqvist et al. | |
| 6,107,944 A | 8/2000 | Behr et al. | |
| 6,134,582 A | 10/2000 | Kennedy | |
| 6,151,628 A | 11/2000 | Xu et al. | |
| 6,167,426 A | 12/2000 | Payne et al. | |
| 6,167,441 A | 12/2000 | Himmel | |
| 6,219,694 B1 | 4/2001 | Lazaridis et al. | |
| 6,285,683 B1 | 9/2001 | Lin | |
| 6,336,135 B1 | 1/2002 | Niblett et al. | |
| 6,393,569 B1 | 5/2002 | Orenshteyn | |
| 6,442,687 B1 | 8/2002 | Savage | |
| 6,477,543 B1 | 11/2002 | Huang et al. | |

(Continued)

FOREIGN PATENT DOCUMENTS

| | | |
|---|---|---|
| EP | 1914640 A1 | 4/2008 |
| GB | 2331600 A | 5/1999 |
| WO | WO01/93097 A2 | 12/2001 |
| WO | WO2008/023270 A2 | 2/2008 |

OTHER PUBLICATIONS

International Search Report PCT/US01/00946, 6 pages.

(Continued)

*Primary Examiner*—Vincent P Harper
*Assistant Examiner*—Mazda Sabouri
(74) *Attorney, Agent, or Firm*—Foley & Lardner LLP

(57) ABSTRACT

A data store is monitored for a change in the data store. A notification communication is generated upon detecting that the change has occurred. The notification communication is formatted based on a wireless device associated with the data store. The notification communication is sent to the wireless device associated with the data store.

26 Claims, 6 Drawing Sheets

U.S. PATENT DOCUMENTS

| | | |
|---|---|---|
| 6,484,150 B1 | 11/2002 | Blinn et al. |
| 6,546,425 B1 | 4/2003 | Hanson et al. |
| 6,606,486 B1 * | 8/2003 | Cubbage et al. .......... 455/186.2 |
| 6,618,763 B1 * | 9/2003 | Steinberg .................... 709/246 |
| 6,636,733 B1 * | 10/2003 | Helferich ................. 455/412.2 |
| 6,647,409 B1 | 11/2003 | Sherman et al. |
| 6,671,355 B1 * | 12/2003 | Spielman et al. ......... 379/88.12 |
| 6,810,405 B1 | 10/2004 | LaRue et al. |
| 6,819,945 B1 * | 11/2004 | Chow et al. ................. 455/567 |
| 6,847,632 B1 * | 1/2005 | Lee et al. .................... 370/352 |
| 6,888,927 B1 * | 5/2005 | Cruickshank et al. .... 379/88.11 |
| 6,917,806 B2 * | 7/2005 | Chng et al. .............. 455/435.1 |
| 6,941,326 B2 * | 9/2005 | Kadyk et al. ................ 707/202 |
| 7,051,080 B1 | 5/2006 | Paul et al. |
| 7,092,998 B2 | 8/2006 | Frietas et al. |
| 7,218,921 B2 * | 5/2007 | Mendiola et al. ......... 455/414.1 |
| 7,325,028 B1 * | 1/2008 | Smith et al. ................. 709/202 |
| 7,362,311 B2 | 4/2008 | Filner et al. |
| 2001/0016845 A1 | 8/2001 | Tribbensee |
| 2001/0020892 A1 * | 9/2001 | Helferich .................... 340/7.3 |
| 2002/0002596 A1 | 1/2002 | Sugiarto et al. |
| 2002/0065064 A1 | 5/2002 | Griffith et al. |
| 2002/0083322 A1 * | 6/2002 | Lagosanto et al. .......... 713/172 |
| 2002/0143971 A1 | 10/2002 | Govindarajan et al. |
| 2002/0156833 A1 | 10/2002 | Maurya et al. |
| 2002/0174106 A1 | 11/2002 | Martin |
| 2003/0078960 A1 | 4/2003 | Murren et al. |
| 2005/0113092 A1 * | 5/2005 | Coppinger et al. .......... 455/436 |
| 2005/0148356 A1 * | 7/2005 | Ferguson et al. ............ 455/502 |
| 2005/0176451 A1 * | 8/2005 | Helferich .................... 455/466 |
| 2006/0013368 A1 * | 1/2006 | LaBaw .................... 379/88.13 |
| 2006/0235945 A1 | 10/2006 | Frietas et al. |
| 2006/0242278 A1 | 10/2006 | Hawkins |
| 2008/0129835 A1 | 6/2008 | Chambers et al. |
| 2009/0063703 A1 | 3/2009 | Finkelstein et al. |

OTHER PUBLICATIONS

Press Release dated Feb. 18, 2002 entitled "Ecrio and Lucent Sign Global Partnership Aimed at Bringing Rich Instant Messaging Solutions to Mobile Operators"; Ecrio Inc. Copyright 2004; http://www.ecrio.com/pressre10.html; (2 pgs.).

Office Action for U.S. Appl. No. 11/426,534, date mailed Dec. 28, 2007, 5 pages.

Office Action for U.S. Appl. No. 11/426,534, date mailed Jul. 3, 2008, 8 pages.

Office Action for U.S. Appl. No. 11/426,534, date mailed Feb. 24, 2009, 13 pages.

* cited by examiner

NOTIFICATION INFRASTRUCTURE FOR SENDING DEVICE-SPECIFIC WIRELESS NOTIFICATIONS

CROSS-REFERENCE TO RELATED APPLICATIONS

This application claims priority to the provisional application titled Notification Infrastructure, filed Jul. 9, 2001, application Ser. No. 60/303,392, which is incorporated in its entirety herein by reference.

FIELD OF THE INVENTION

The present invention relates to communications to wireless devices. In particular, the present invention relates to sending wireless notification communications formatted for a particular wireless device in response to detected changes in a monitored data store.

BACKGROUND OF THE INVENTION

Wireless devices, such as cellular phones and some handheld computers, are capable of communicating with various other types of computer devices, including other cellular phones and handheld computers, through use of wireless media and channels. Using so-called push technology, these other devices can transmit information to wireless devices in the form of an alert or notification. Due to the many different forms that such information can take and the many different kinds of wireless devices existing today, the ability to send notifications to wireless devices is typically limited and constrained to be enabled only among devices that can communicate in a select form and medium. Such incompatibility often prevents the wireless device from being used with more than one source of information, restricting the informative value of the wireless device.

SUMMARY OF THE INVENTION

According to embodiments of the invention, a data store is monitored for a change in the data store. A notification communication is generated upon detecting that the change has occurred. The notification communication is formatted based on a wireless device associated with the data store. The notification communication is sent to the wireless device associated with the data store.

BRIEF DESCRIPTION OF THE DRAWINGS

Embodiments of the invention are illustrated by way of example, and not by way of limitation, in the figures of the accompanying drawings. Like reference numerals are intended to refer to similar elements among different figures.

DETAILED DESCRIPTION OF THE INVENTION

Embodiments of the invention describe a method and system for sending device-specific wireless communications. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Introduction

Embodiments of the invention enable messages to be pushed to wireless devices in response to changes in a data store. A user of a wireless device may configure his wireless device to receive notifications, customized according to the user's preferences, from systems that monitor multiple selected data stores. This allows a variety of wireless devices to receive communications about a variety of data stores, regardless of the format of the data within the data stores, and regardless of protocols that these wireless devices use for wireless communications. Thus, wireless devices originally designed to operate with a single proprietary service may be extended to operate with multiple services; even services with which such wireless devices were not originally designed to operate. Additionally, embodiments of the invention ensure that modifications made to data stored on a wireless device are reflected in remote data stores automatically when such modifications are made. This assures that data stored in both remote data stores and on associated wireless devices is current and correct, and also eliminates long waiting periods that might otherwise occur if a user manually initiated a "synchronization" of multiple modification events. Further benefits become apparent from the description below.

System to Provide Notifications to a Plurality of Wireless Devices

Figure 1:
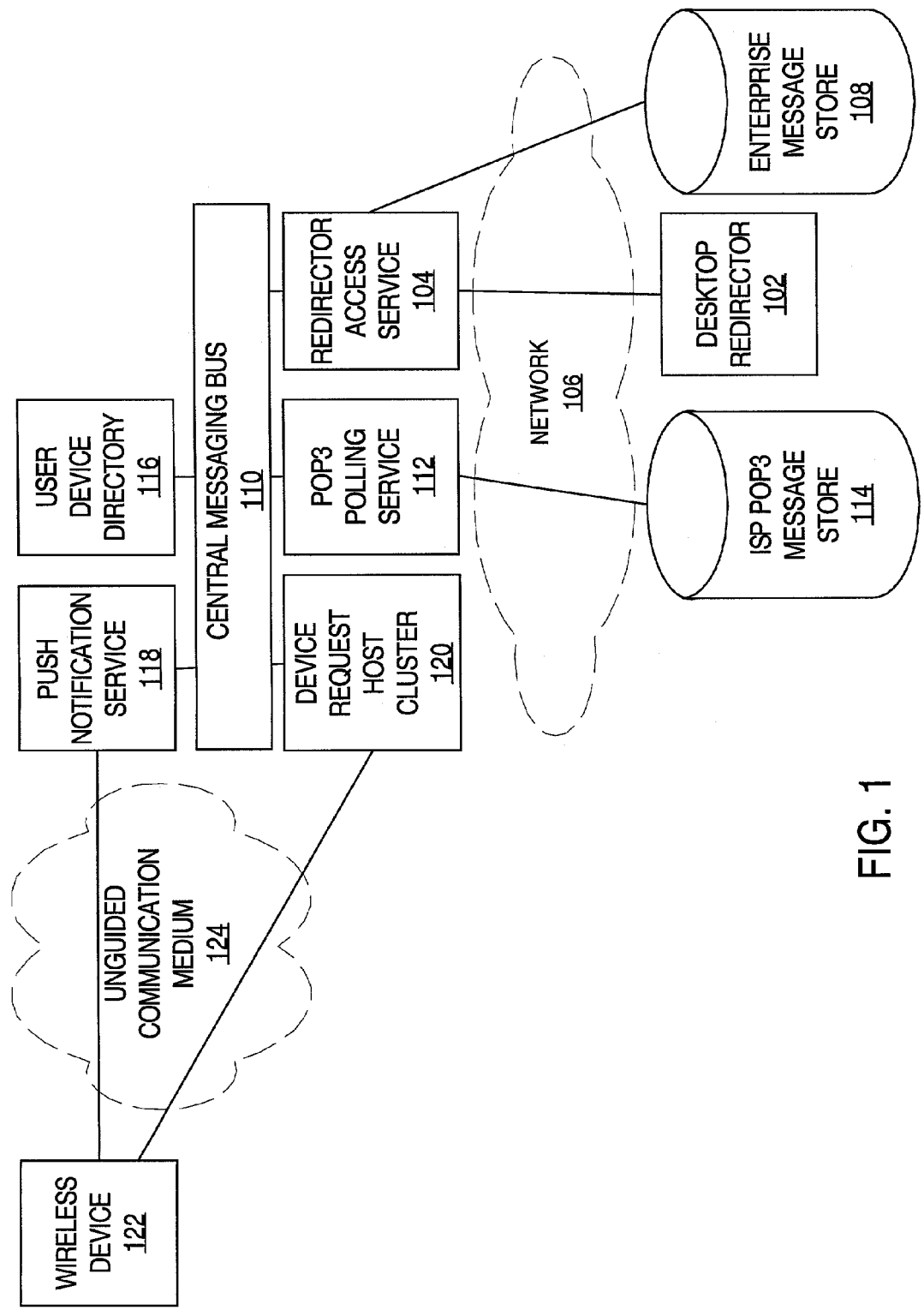
FIG. 1 shows a block diagram of a system to provide notifications to a plurality of wireless devices according to an embodiment of the invention.

FIG. 1 shows a block diagram of a system to provide notifications to a plurality of wireless devices, according to an embodiment of the invention. The system includes a desktop redirector 102, a redirector access service 104, a network 106, an enterprise message store 108, a central messaging bus 110, a Post Office Protocol Version 3 (POP3) polling service 112, an Internet Service Provider (ISP) POP3 message store 114, a user device directory 116, a push notification service 118, a device request host cluster 120, a wireless device 122 (which is potentially one of many varying wireless devices), and an unguided (e.g., "wireless") communication medium 124.

Desktop redirector 102 is logically coupled with redirector access service 104 through network 106. Examples of network 106 include wide-area networks, such as the Internet. Other examples of networks include intra-networks and local area networks. Redirector access service 104 is logically coupled with enterprise message store 108 through network 106. Redirector access service 104 is also logically coupled with central messaging bus 110. Central messaging bus 110 is logically coupled with POP3 polling service 112, user device directory 116, push notification service 118, and device request host cluster 120. POP3 polling service 112 is also logically coupled with IPS POP3 message store 114 through network 106. Push notification service 118 and device request host cluster 120 are logically coupled with wireless device 122 (which is potentially one of many varying wireless devices so logically coupled) through unguided communication medium 124. Examples of unguided communication medium 124 include electromagnetic waves, such as radio waves, microwaves, infrared light, etc.

In one embodiment, desktop redirector 102 communicates with redirector access service 104 through a HyperText Transfer Protocol (HTTP) or Simple Mail Transfer Protocol (SMTP) message push channel. Redirector access service 104 may be capable of communicating with enterprise message store 108 through a HyperText Transfer Protocol (HTTP) or Simple Mail Transfer Protocol (SMTP) message push channel. Redirector access service 104 may be capable or communicating with enterprise message store 108 through an SMTP command channel.

Some of the functionality of the elements of the system disclosed above is described below, according to embodiments of the invention. Desktop redirector 102 monitors a message store (i.e., a data store) through, for example, polling or an event listener. Desktop redirector 102 forwards new messages to Redirector Access Service 104. Desktop redirector 102 also processes, executes, and removes command messages from the message store.

Redirector access service 104 receives new message from desktop redirector 102 and inserts these messages into a queue. Redirector access service 104 also subscribes to outbound command events such as, for example, message delete or mark as read.

Enterprise message store 108 may include a Microsoft Exchange Server data store or a Microsoft Outlook data store stored on the same computer that executes desktop redirector 102. Other examples for enterprise message store include digital voice-mail boxes and inventory control systems.

Central message bus 110 is a "middleware" layer that handles the delivery of messages between the elements of the system with which it is logically coupled. Central message bus 110 supports persistence for guaranteed delivery, and is therefore robust and highly scalable.

POP3 polling service 112 polls user POP3 accounts at regular intervals and inserts retrieved messages into a queue for notification and retrieval. ISP POP3 message store 114 maintains user POP3 accounts and stores messages for those accounts.

User device directory 116 subscribes to user query events and returns user/device provisioning information and POP account details.

Push notification service 118 subscribes to notification events (i.e., notification communications) and delivers these notification events via outbound services that use Wireless Application Protocol (WAP), Short Message Service (SMS), and/or Mobitex, etc.

Device request host cluster 120 receives Transmission Control Protocol (TCP) or User Datagram Protocol (UDP) requests for queued messages along with outbound actions such as delete or mark as read. Device request host cluster 120 also returns messages, such as in the form of e-mail, and possibly other metadata.

Wireless device 122 includes communication hardware that handles the reception of notification communications, and possibly message retrieval requests, independently of software applications stored on wireless device 122. In one embodiment, wireless device 122 may also store and execute an e-mail software application for the viewing and management of received e-mail messages. Such management may include deletion and mark as read actions. Wireless device 122 may send these actions to device request host cluster 120 for processing and execution.

Redirector access service 104, central messaging bus 110, POP3 polling service 112, user device directory 116, push notification service 118, and device request host cluster 120 may be implemented as software routines or processes (i.e., servers) that are executable on a same computer, or as software routines or processes that are executable on multiple different computers where those multiple different computers are capable of communicating with each other to the extent that the software routines or processes are capable of communicating with each other as described. These software routines or processes may be executable concurrently with each other.

Technique for Providing Notifications to Wireless Device

Figure 2:
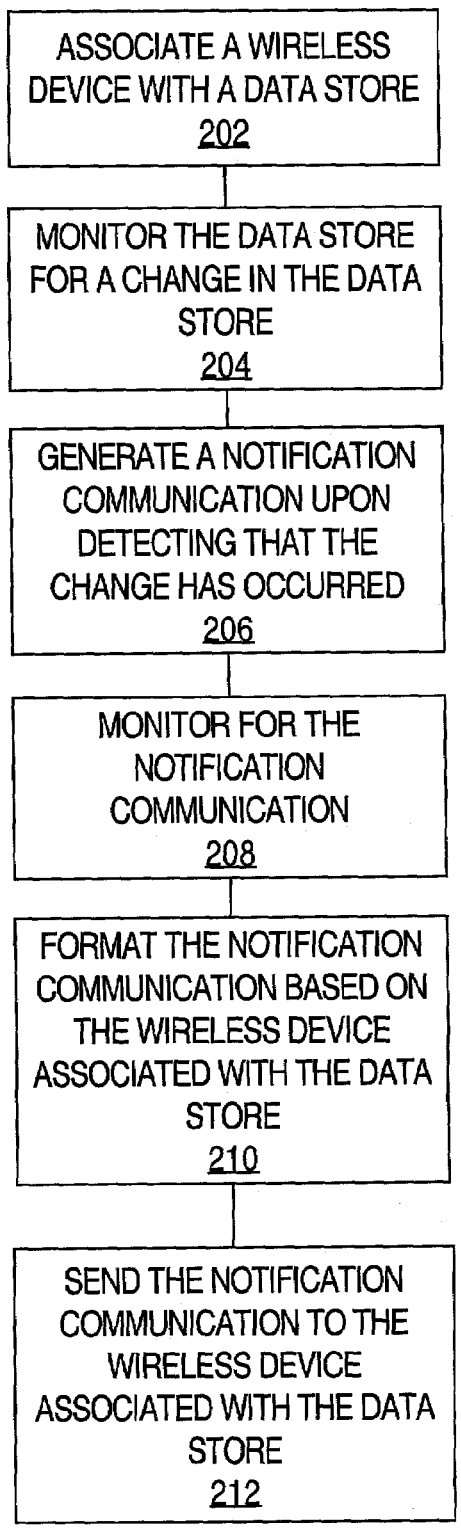
FIG. 2 shows a flow diagram for providing notifications to a particular wireless device in a plurality of wireless devices according to an embodiment of the invention.

FIG. 2 shows a method for providing notifications to a particular wireless device in a plurality of wireless devices according to an embodiment of the invention. References to components of FIG. 1 below are entirely illustrative and exemplary.

In processing block 202, a wireless device may be associated with a data store. The examples of possible data stores with which wireless device 122 may be associated are numerous and are not exhaustively listed herein. For example, wireless device 122 may be associated with ISP POP3 message store 114. For another example, wireless device 122 may be associated with enterprise message store 108. For yet another example, wireless device 122 may be associated with email client application data stored on a computer on which desktop redirector 102 executes. For further examples, wireless device 122 may be associated with a voicemail data store, an instant message data store and/or an inventory store. Wireless device 122 may be simultaneously associated with more than one data store. User device directory 116 may store the association between wireless device 122 (and other wireless devices) and one or more data stores.

In processing block 204, the data store is monitored for a change in the data store. Such monitoring may be achieved through polling, event listening, or other monitoring techniques. For example, desktop redirector 102 may monitor email client application data stored on a computer on which desktop redirector 102 executes. For another example, POP3 polling service 112 may monitor ISP POP3 message store 114 for a change in ISP POP3message store 114.

In processing block 206, a notification communication is generated upon detecting that the change has occurred. For example, desktop redirector 102 may generate a notification communication upon detecting that a change has occurred in email client application data stored on a computer on which desktop redirector 102 executes. Desktop redirector 102 may deliver such a notification communication to redirector access service 104. For another example, POP3 polling service 112 may generate a notification communication upon detecting that a change has occurred in ISP POP3 message store 114. A newly generated notification communication may be placed in a notification communication queue. For example, redirector access service 114 may receive a newly generated notification communication from desktop redirector 102 and place the notification communication in a notification communication queue. For another example, POP3 polling service 112 may place a notification communication message that POP3 polling service 112 has newly generated into a notification communication queue.

In processing block 208, monitoring for the notification communication may occur. For example, push notification service 118 may monitor a notification communication queue for a notification communication generated by desktop redirector 102 or POP3 polling service 112. Notification communications may be delivered between system elements through central messaging bus 110.

In processing block 210, the notification communication is formatted based on the wireless device associated with the data store. For example, push notification service 118 may format a notification communication based on wireless device 122 if the notification communication is destined for wireless device 122. Push notification service 118 may format the notification communication differently based on another wireless device in the plurality of wireless devices if the notification communication is destined for such another wireless device. This allows a variety of wireless devices to communicate with a variety of data stores regardless of the format of the data within the data stores and regardless of protocols that these wireless devices are capable of using.

In processing block 212, the notification communication is sent to the wireless device associated with the data store. For example, push notification service 118 may send wireless device 122 a notification communication formatted for wireless device 122 when the notification communication is destined for that particular device. Push notification service 118 may send the notification communication to another one of the plurality of wireless devices, in the format of that device, if the notification communication is destined for such another wireless device. Communication hardware of wireless device 122 may handle the reception of notification communications independently of software applications stored or executed by wireless device 122. An email software application may be stored and executed by wireless device 122. Such an email software application may provide for the viewing and management of any notification communications that are essentially email messages.

Exemplary Details of the Technique for Providing Notifications to a Wireless Device The user of the wireless device 122 may modify the data stored on the wireless device 122 using an application executed by the wireless device 122. For example, the user may delete an email message or mark an email message as having been read. As another example, a user may listen to a voicemail or cause an inventory of an item to be reduced by sending out an electronic purchase order. Modifications to the data stored on the wireless device may be transmitted through unguided communication medium 124 to device request host cluster 120. Device request host cluster may receive these modifications and modify corresponding data stores (e.g., ISP POP3 message store 114, enterprise message store 108, etc.) to reflect these modifications. Device request host cluster 120 may also receive Transmission Control Protocol (TCP) or User Datagram Protocol (UDP) requests for queued messages. Device request host cluster 120 may also return email messages and metadata to system elements requesting such information.

The format by which the notification communication is to be formatted may be selected from a plurality of formats based on the wireless device associated with the data store. The format may be selected from formats such as plain text, Hypertext Markup Language (HTML), Handheld Device Markup Language (HDML), Compact Hypertext Markup Language (CHTML), or other Extensible Markup Language (XML) message types, in Unicode or binary formats, or in proprietary binary message formats. The format may be selected based on a capability of the wireless device to interpret the format. Information about the capabilities of wireless device 122 (and other wireless devices in the plurality of wireless devices), such as the formats and protocols by which wireless device 122 is capable of communicating, may be obtained from user device directory 116. User device directory 116 may subscribe to query events and return provisioning information concerning wireless devices in the plurality of wireless devices to elements requesting such information. User device directory 116 may also return POP account information to elements requesting such information.

A protocol for which the notification communication is to be formatted may be selected from a plurality of protocols based on the wireless device associated with the data store. The protocol may be selected from protocols such as Simple Mail Transfer Protocol (SMTP), Hypertext Transfer Protocol (HTTP), Short Message Service (SMS), Transmission Control Protocol (TCP), User Datagram Protocol (UDP), Wireless Application Protocol (WAP), and Mobitex. The protocol may be selected based on a capability of a network associated with the wireless device to use the protocol. Multiple protocols may be selected in instances those multiple protocols are compatible.

The notification communication may be segmented into multiple segments in response to the selection of a protocol. This segmentation may be performed in order to enable delivery of the notification communication using a protocol (e.g., SMS) that is incapable of sending (or for which it is impractical to send) the entire notification at once, but that is capable of sending (or for which it is more practical to send) each of the multiple segments separately. Such segmentation may be performed, for example, by push notification service 118.

Examples of data store structures include a groupware database, an email folder, a relational database, etc. The data store may include a message set in a message folder. In such a case, the data store may be monitored for (i) an addition of a new message to the message folder, (ii) a deletion of an existing message in the message folder, (iii) a moving of an existing message from the message folder to another folder, or from the other folder to the message folder, and/or (iv) a modification of a status of an existing message in the message folder.

In another embodiment, the data store may include a contact list. In such a case, the data store may be monitored for (i) an addition of a new contact to the contact list, (ii) a deletion of an existing contact from the contact list, (iii) a moving of a contact from the contact list or into the contact list, (iv) a modification of values assigned to one or more fields in an existing contact in the contact list.

In another embodiment, the data store may include a task list. In such a case, the data store may be monitored for (i) an addition of a new task to the task list, (ii) a deletion of an existing task from the task list, (iii) moving a task from or to the task list, and/or (iv) a modification of a content of an existing task in the task list.

Still, further, the data store may include a set of calendar events. In such a case, the data store may be monitored for (i) an addition of an event to the set of calendar events, (ii) a deletion of an existing event from the set of calendar events, (iii) a moving of an event from a first time period to a second time period, and/or (iv) a modification of an attribute of an event.

The data store may include a set of records, such as a set of records in a database. In such a case, the database may be monitored for (i) an addition of a new record to the set of records, (ii) a deletion of an existing record from the set of records, (iii) a moving of a record from or to the set of records, (iv) a modification of a content or attribute of an existing record in the set of records, etc.

A message readable by an application executable by the wireless device may be generated as a part of the notification communication generated upon determining that the change in the data store has occurred. Such a message, when received by the wireless device, may cause the application to modify data stored on the wireless device based on the change in the data store. For example, an email message, contact, calendar event, or task added or deleted from the data store may be similarly added or deleted from data stored on the wireless device. Such "synchronizing" modifications to data stored on the wireless device ensure that the data stored on the wireless device will be relatively current and correct in relation to data in the data store. Alternatively, a message included in a notification communication may be directly outputted to a user of the wireless device. The notification communication may include a combination of the types of messages described above.

The type, content or characteristics of a notification communication may be selected based on the change to the data store. For example, the notification communication may include an alert stating the nature of the change to the data store, such as an alert that a new voicemail message has been delivered to the user's voice mailbox and the identity of the sender of the new voicemail message and the date and time at which the new voicemail message was sent. For another example, the notification communication may include contents of a new email message whose addition to the email client application data or ISP POP3 message store 114 was the change in the data store as described above.

The notification communication may be sent to the wireless device associated with the data store automatically after determining that the notification communication has been generated. For example, push notification service 118 may deliver a notification communication to wireless device 122 independent of any action taken by a user of wireless device 122 whenever push notification service 118 detects a notification communication in a notification communication queue. This ensures that the data stored on the wireless device will be relatively current and correct in relation to monitored data in the data store. Corresponding data at the two locations will match at any time that a user of the wireless device accesses the data store on the wireless device. Among other advantages, embodiments such as described eliminate long "synchronization" time periods during which such a user must wait for large amounts of backlogged data to be transmitted from a source outside of the wireless device after the user manually initiates such a transmission.

The monitoring for the change in the data store and the generation of the notification communication in response to detecting the change may be performed concurrently with the monitoring for the notification communication. For example, desktop redirector 102 or POP3 polling service 112, which may monitor for the change in the data store and generate a notification communication in response to detecting the change, may be implemented as a software routine or process that executes independently of and concurrently with a software routine or process that implements push notification service 118, which may monitor a notification communication queue for a notification communication. Such independence and concurrence prevents the system from being stalled by bursts of notification communications that may occur in rapid succession.

In an embodiment, a separate software routine or process may be implemented for each different format in which a notification communication may be formatted to send only those notification communications that are formatted according to a specified format or protocol. For example, push notification service 118 may be implemented as several separate software routines or processes that execute concurrently and independently of each other. One or more of the routines are processes may be to send only SMS-formatted notification communications, another to send only SMTP-formatted notification communications, another to send only WAP-formatted notification communications, and another process or routine send only Palm Push-formatted notification communications.

The wireless device may be associated with the data store using user-input received through a network browser interface. For example, a user may access and modify information concerning the association of his particular wireless device with one or more uniquely identified user accounts by directing a network browser application such as Microsoft Internet Explorer or Netscape Navigator to a web server that interfaces with data stored in user device directory 116. The web server may responsively return a web page to the network browser application that contains information about current associations and a form including fields for the entry of new associations or the modification or deletion of existing notifications. Such a web page may segregate information according to categories of data store user accounts (e.g., groupware accounts, email accounts, voicemail accounts, etc.). Such a form may also include fields (e.g., checkbox controls) for designating whether notification communications associated with each data store user account should be sent to the user's wireless device. The web server may require a user to supply a unique user identifier and a password prior to returning such a web page. In response to submitting information in a form included in the web page to the web server via the network browser interface, the web server may interface with user device directory 116 and modify associations stored therein according to the information submitted. Consequently, push notification service 118 will send a notification communication to the user's wireless device only if the notification communication was generated due to a change in a data store associated with a data store user account for which the user indicated in the submitted information notifications should be sent.

Figure 3:
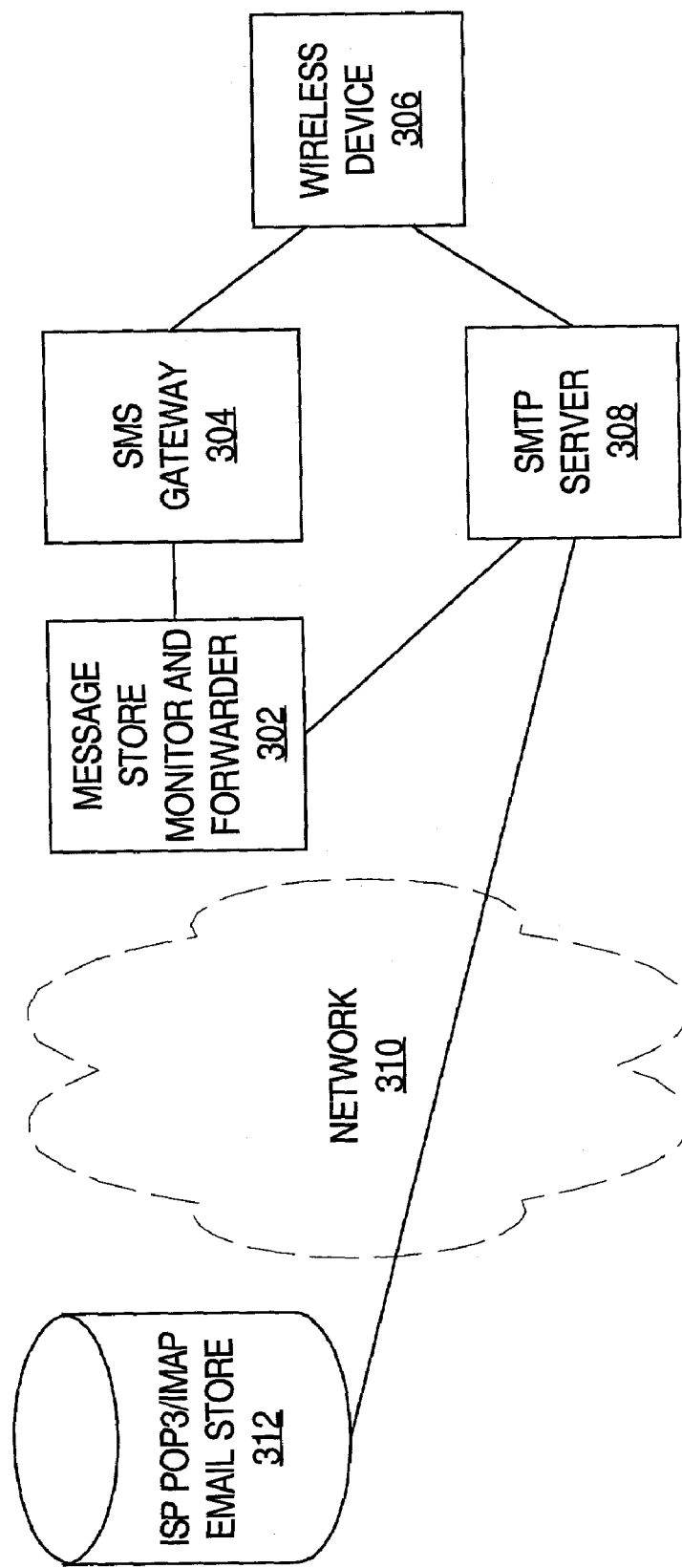
FIG. 3 shows a block diagram of a system to receive notifications from a server through a Short Message Service (SMS) gateway and to include contents of a first email received in multiple segments through the SMS gateway in a second email generated responsively to the first email according to an embodiment of the invention.

System to Receive Notifications Through SMS and to Include Original Text in Sent Messages FIG. 3 shows a block diagram of a system to receive notifications from a server through a Short Message Service (SMS) gateway and to include contents of a first email received in multiple segments through the SMS gateway in a second email generated responsively to the first email according to an embodiment of the invention. Components shown in FIG. 3 may be part of or additional to components such as are shown in FIG. 1.

A message store monitor and forwarder 302 is capable of communicating with Short Message Service (SMS) gateway 304. Message store monitor and forwarder 302 may include one or more of desktop redirector 102, POP3 polling service 112, push notification service 118, etc. SMS gateway 304 is capable of communicating with a wireless device 306 through an SMS channel. Wireless device 306 is capable of communicating with Simple Mail Transfer Protocol (SMTP) server 308 through an SMTP channel over Transmission Control Protocol over Internet Protocol (TCP/IP). Wireless device 306 is analogous to wireless device 122. SMTP server 308 is capable of communicating with message store monitor and forwarder 302. SMTP server 308 may include device request host cluster 120. SMTP server 308 is also capable of communicating with ISP POP3/Internet Message Access Protocol (IMAP) email store 312 through network 310. ISP POP3/IMAP email store 312 may include one or more of ISP POP3 message store 114, enterprise message store 108, etc. Network 310 may include the Internet, wireless access networks, combinations thereof, and other types of wide area networks, although other types of local or intra-networks are contemplated.

Technique for Receiving Notifications Through SMS

Figure 4:
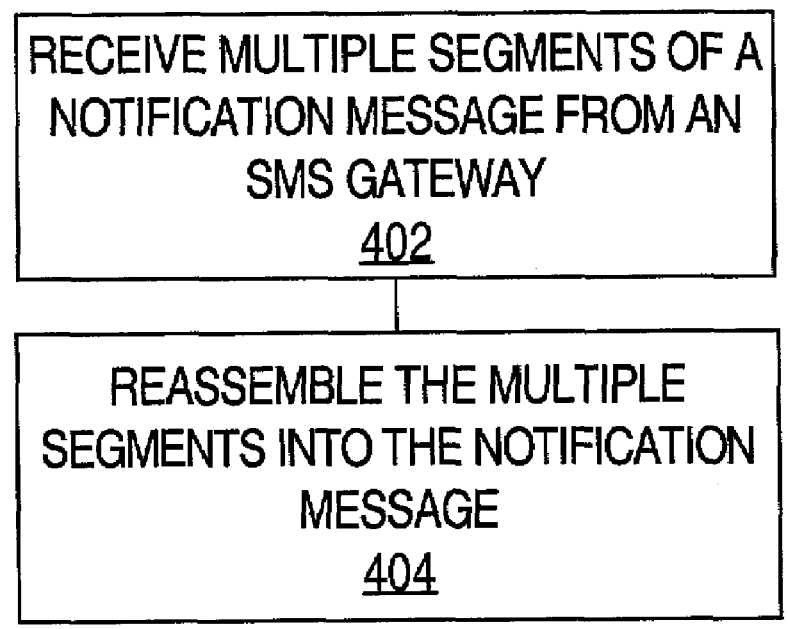
FIG. 4 shows a flow diagram for receiving notifications from a server through a Short Message Service (SMS) gateway according to an embodiment of the invention.

FIG. 4 shows a method for receiving notifications from a server through a Short Message Service (SMS) gateway according to an embodiment of the invention. In processing block 402, multiple segments of a notification message are received from an SMS gateway. For example, wireless device 306 may receive multiple segments of a notification message from message store monitor and forwarder through SMS gateway 304. Each of the multiple segments may be a short message formatted according to SMS protocol. As described above, such segmentation may be performed by push notification service 118, which may be included in message store monitor and forwarder 302. In processing block 404, the multiple segments are reassembled into the notification message. For example, an application stored and executed by wireless device 306 may reassemble the received multiple segments into the original unified notification message. Such an application may then present the original unified notification message to a user of the wireless device 306.

Technique for Including Original Text in Sent Messages

Figure 5:
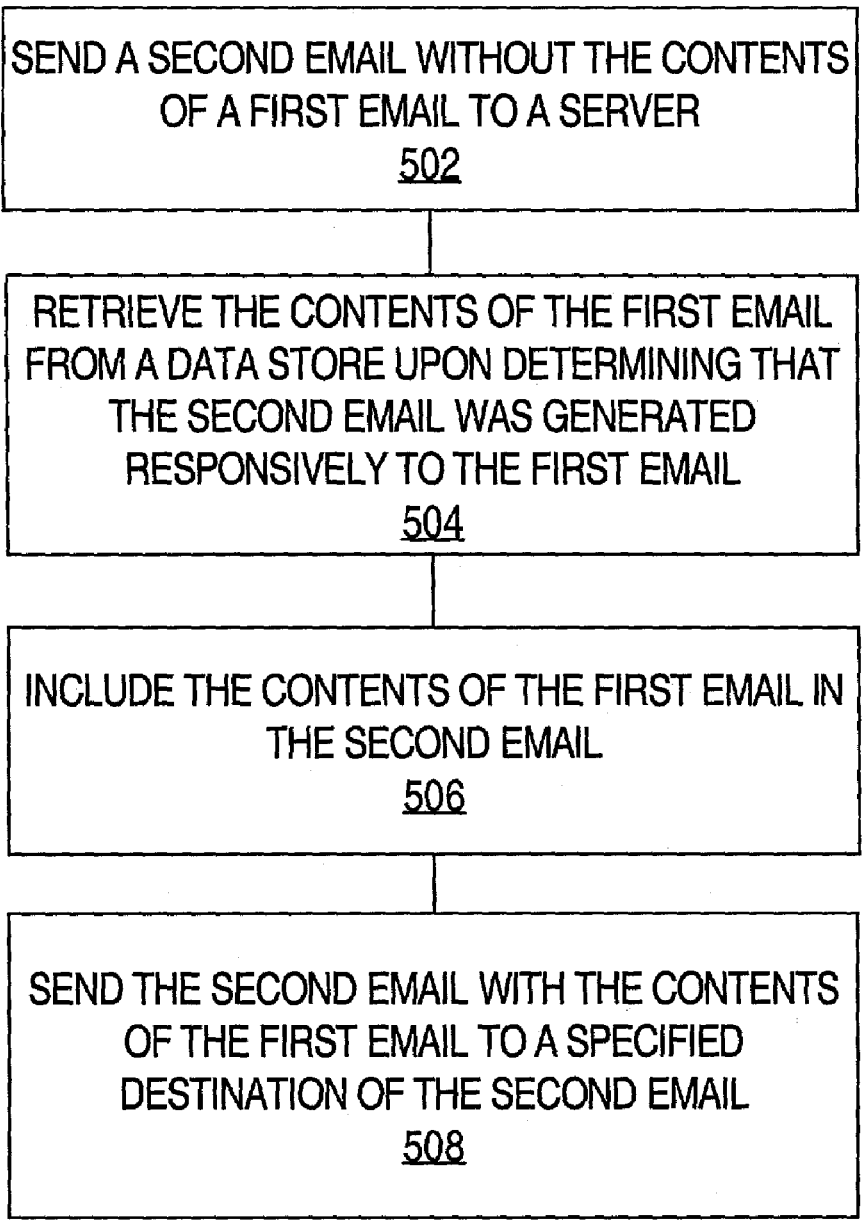
FIG. 5 shows a flow diagram for including contents of a first email received in multiple segments through an SMS gateway in a second email generated responsively to the first email according to an embodiment of the invention.

FIG. 5 shows a technique for including contents of a first email received in multiple segments through an SMS gateway in a second email generated responsively to the first email according to an embodiment of the invention. For example, the second email may be an email generated in reply to the first email or a forwarded version of the first email, in either of which a user desired to include the contents of the first email. In processing block 502, a second email is sent without the contents of a first email to a server. For example, wireless device 306 may send the second email to SMTP server 308. In processing block 504, the contents of the first email are retrieved from a data store upon determining that the second email was generated responsively to the first email. For example, SMTP server 308 may determine that the second email was generated responsively to the first email (e.g., because the second email is a reply to the first email or a forwarded version of the first email) and retrieve the contents of the first email from ISP POP3/IMAP email store 312. For another example, SMTP server 308 may retrieve the contents of the first email from message store monitor and forwarder 302. In processing block 506, the contents of the first email are included in the second email. For example, SMTP server 308 may include the contents of the first email in the second email. In processing block 508, the second email is sent, with the contents of the first email, to a specified destination of the second email. For example, SMTP server 308 may send the second email with the contents of the first email, addressed to an intended recipient(s), to ISP POP3/IMAP email store through network 310. Subsequently, the intended recipient(s) may retrieve the second email from ISP POP3/IMAP email store 310.

Exemplary Wireless Device

Figure 6:
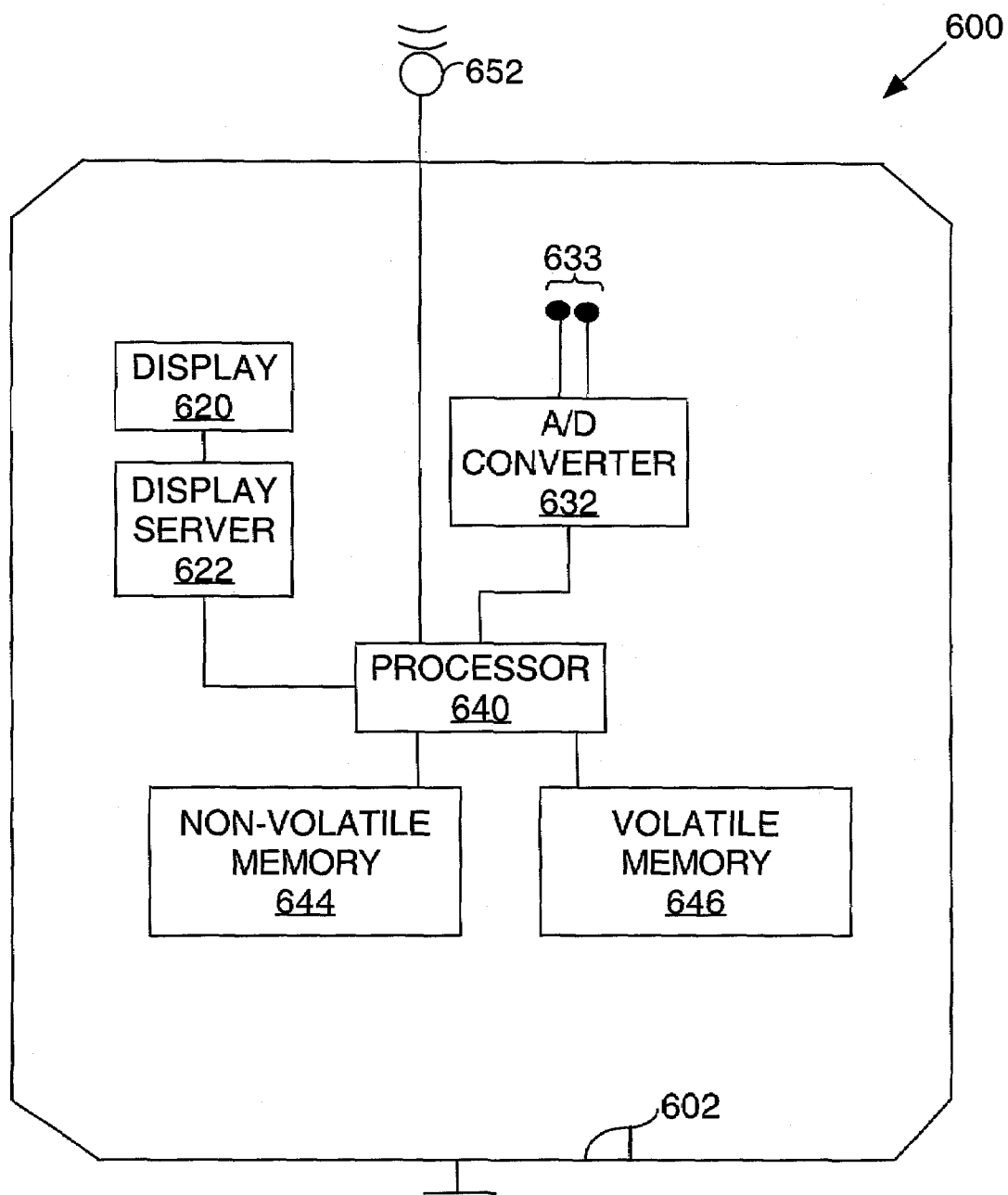
FIG. 6 is a block diagram for a handheld computer according to an embodiment of the invention.

FIG. 6 is a block diagram for an electronic device with wireless functionality for use with an embodiment of the invention. The electronic device 600 is analogous to wireless device 122.

The electronic device may include smart wireless phones, personal digital assistants with wireless functionality, or other similar wireless handheld computers. Examples of handheld computers include devices that operate the PALM OS (manufactured by PALM INC.) and POCKET PC (manufactured by MICROSOFT CORP.).

In an embodiment, electronic device 600 includes a processor 640 coupled to a first memory 644 (non-volatile) and a second memory 646 (volatile). The processor 640 is coupled to a display driver 622. The processor 640 combines with display driver 622 to process and signal data for presentation on a display assembly 620. The display assembly 620 includes screen and digitizer.

An analog-digital (AD) converter 632 is coupled to processor 640. One or more channels from A/D converter 632 maybe used to convert analog input provided by the digitizer, or by another analog input mechanism. The A/D converter 632 may include multiple channels 633. In one embodiment, a wireless port 652 connects to the processor to extend wireless communications to the electronic device 600. The wireless port 652 may include a wireless transmitter, receiver, and antenna. The medium in which the wireless port 652 operates may be radio frequency.

The electronic device 600 may include one or more expansion ports for coupling to accessory devices, such as cradles, modems, memory units, re-chargers and other devices. Examples of expansion ports include serial ports, Universal serial Bus (USB) ports, CompactFlash slots and infrared ports. In an embodiment shown, a first expansion port 602 enables one or more types of expansion modules to be connected to processor 640.

The accessory device that may be coupled to expansion port 602 may be identified by primary functions of their internal components. Each accessory device may include one or more of the following set of components: a processor, an input mechanism, additional memory, a battery, or another A/D converter. The wireless port 652 may alternatively be provided through the expansion port 602 as an accessory device. For example, wireless port 652 may be part of a PCMCIA card that is inserted through a serial connector port of electronic device 600.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A computer-implemented method for providing notifications to a wireless device; the method comprising:
monitoring a groupware data collection for a change using computing electronics, the groupware data collection comprising a plurality of records for each of a contact list, a calendar, and a message folder, wherein the groupware data collection is assigned to a user account and associated with the wireless device, and wherein monitoring the groupware data collection includes monitoring for any one of an addition, deletion, or modification to any one or more of the plurality of records that comprise the data collection;
generating a notification communication from a notification source using computing electronics upon detecting that the change has occurred;
performing a formatting on the notification communication using computing electronics, including determining a configuration for the formatting based on (i) identifying a type of wireless communication device that is to receive the notification, and (ii) selecting one of multiple possible communication protocols that the identified type of wireless device is able to handle;

queuing the notification communication for the wireless device using computing electronics until a communication event is detected from the wireless device that terminates the queue; and responsive to the communication event, sending the notification communication using computing electronics to the wireless device associated with the data collection using the selected one of the multiple possible communication protocols;

wherein the step of performing a formatting further comprises selecting one of multiple possible formats that the identified type of wireless device is able to handle, wherein the step of sending the notification communication further comprises using the selected one of the multiple possible formats.

2. The method of claim 1, wherein selecting one of multiple possible protocols includes selecting the protocol from at least one of Simple Mail Transfer Protocol (SMTP), Hypertext Transfer Protocol (HTTP), Short Message Service (SMS), Transmission Control Protocol (TCP), User Datagram Protocol (UDP), Wireless Application Protocol (WAP), and a protocol for a Mobitex network.

3. The method of claim 1, wherein performing a formatting on the notification communication includes segmenting the notification communication into multiple segments in response to selecting the protocol.

4. The method of claim 3, wherein the sending the notification communication to the wireless device associated with the data collection includes sending the multiple segments to the wireless device associated with the data collection using a protocol incapable of sending the entire notification communication at once but capable of sending each of the multiple segments separately.

5. The method of claim 1, wherein performing a formatting on the notification communication includes selecting the communication protocol based on a capability of a network associated with the wireless device to use the communication protocol.

6. The method of claim 1, further comprising:
associating the wireless device with the data collection using computing electronics prior to generating a notification communication.

7. The method of claim 6, wherein associating the wireless device with the data collection includes associating the wireless device with the data collection using user-input received through a network browser interface.

8. The method of claim 1, wherein the sending the notification communication to the wireless device associated with the data collection includes sending the notification communication automatically after determining that the notification communication has been generated.

9. The method of claim 1, wherein the generating a notification communication upon determining that the change has occurred includes generating a message readable by an application executable on the wireless device.

10. The method of claim 9, wherein the generating the message readable by the application executable by the wireless device includes generating a message that, when received by the wireless device, causes the application to modify data stored on the wireless device based on the change in the data collection.

11. The method of claim 1, wherein the generating a notification communication upon determining that the change has occurred includes generating a message that is outputted to a user of the wireless device.

12. The method of claim 1, wherein the monitoring the groupware data collection includes monitoring at least one of a data collection selected from a group of data collections consisting of a groupware database, an email folder, and a relational database.

13. The method of claim 1, wherein the monitoring the groupware data collection includes monitoring a message set in a message folder for at least one of: (i) addition of a new message to the message folder, (ii) deletion of an existing message in the message folder, (iii) a moving of an existing message from the message folder to another folder, or from the other folder to the message folder, or (iv) a modification of a status of an existing message in the message folder.

14. The method of claim 1, wherein the monitoring the groupware data collection for the change includes monitoring a contact list for at least one of (i) addition of a new contact to the contact list, (ii) deletion of an existing contact from the contact list, (iii) a moving of a contact from the contact list or into the contact list, or (iv) a modification of values assigned to one or more fields in an existing contact in the contact list.

15. The method of claim 1, wherein the monitoring the groupware data collection for the change includes monitoring a task list for at least one of (i) addition of a new task to the task list, (ii) deletion of an existing task from the task list, (iii) moving a task from or to the task list, and (iv) a modification of a content of an existing task in the task list.

16. The method of claim 1, wherein the monitoring the groupware data collection for the change includes monitoring a set of calendar events for at least one of (i) addition of an event to the set of calendar events, (ii) deletion of an existing event from the set of calendar events, (iii) moving of an event from a first time period to a second time period, (iv) modification of an attribute of an event.

17. The method of claim 1, wherein the monitoring the groupware data collection for the change includes monitoring a set of records for at least one of (i) addition of a new record to the set of records, (ii) deletion of an existing record from the set of records, (iii) a moving of a record from or to the set of records, and (iv) a modification of a content or attribute of an existing record in the set of records.

18. The method of claim 1, wherein the generating the notification communication upon detecting that the change has occurred includes selecting the notification communication from a plurality of notification communications based on the change.

19. The method of claim 1, wherein queuing the notification communication includes queuing the notification communication until the wireless device sends a request.

20. The method of claim 1, wherein sending the notification communication includes pushing the notification communication to the wireless device.

21. The method of claim 1, wherein the notification source is a server side service of a network.

22. The method of claim 1, wherein the notification source is a computer associated with the wireless device.

23. The method of claim 1, wherein monitoring a groupware data collection for a change includes monitoring one or more data collections for changes to data of a plurality of data types.

24. The method of claim 23, wherein the wireless device is simultaneously associated with more than one data collection of a plurality of data collections.

25. The method of claim 24, wherein the plurality of data collections include two or more data collections selected from a group consisting of (i) a POP3 message store, (ii) an enterprise message store, (iii) an email client application data store, (iv) a voicemail data store, (v) a SMS data store, and (vi) an inventory data store.

26. A computer-implemented method for providing notifications to a wireless device, the method comprising:

monitoring a data collection comprising at least one of electronic messages, contacts and calendar appointments for a change using computing electronics, including monitoring for any one of an addition, deletion, or modification to any one or more of the plurality of records that comprise the data collection;

generating a notification communication from a notification source using computing electronics upon detecting that the change has occurred;

identifying multiple wireless devices that are to receive a notification communication using computing electronics;

for each of the multiple wireless devices, determining one of a plurality of possible formats that the wireless device is able to handle and one of a plurality of possible protocols that the wireless device is able to handle for the notification communication, the plurality of possible protocols being determined using computing electronics based on a proprietary wireless service that is used by that device; and responsive to respective communication events from each of the wireless devices, sending the notification communication using computing electronics to the corresponding wireless device associated with the data collection in one of the plurality of possible formats and protocols identified for that device.

* * * * *

UNITED STATES PATENT AND TRADEMARK OFFICE
CERTIFICATE OF CORRECTION

PATENT NO. : 7,668,535 B2  
APPLICATION NO. : 10/159545  
DATED : February 23, 2010  
INVENTOR(S) : Conneely et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 768 days.

Signed and Sealed this

Seventh Day of December, 2010

David J. Kappos  
*Director of the United States Patent and Trademark Office*